US012204969B2

(12) United States Patent
Thorsen et al.

(10) Patent No.: US 12,204,969 B2
(45) Date of Patent: Jan. 21, 2025

(54) AUTOMATIC LABELING OF OBJECTS IN SENSOR DATA

(71) Applicant: WAYMO LLC, Mountain View, CA (US)

(72) Inventors: Justin Thorsen, Issaquah, WA (US); Changchang Wu, Bothell, WA (US); Alper Ayvaci, San Jose, CA (US); Tiffany Chen, Santa Clara, CA (US); Lo Po Tsui, Mountain View, CA (US); Zhinan Xu, San Jose, CA (US); Chen Wu, Cupertino, CA (US); Sean Rafferty, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 17/893,376

(22) Filed: Aug. 23, 2022

(65) Prior Publication Data

US 2023/0046289 A1 Feb. 16, 2023

Related U.S. Application Data

(63) Continuation of application No. 16/827,835, filed on Mar. 24, 2020, now Pat. No. 11,475,263.

(51) Int. Cl.
*G06K 19/067* (2006.01)
*G09F 3/00* (2006.01)

(52) U.S. Cl.
CPC ......... *G06K 19/067* (2013.01); *G09F 3/0291* (2013.01)

(58) Field of Classification Search
CPC .................................. G06K 19/067

USPC .......................................................... 235/439
See application file for complete search history.

(56) References Cited

U.S. PATENT DOCUMENTS

| 6,067,031 | A  | * | 5/2000  | Janky ..................... G01S 13/931 |
|           |    |   |         | 340/904                                |
| 9,868,446 | B1 | * | 1/2018  | Zhu ........................ G08G 1/163 |
| 10,013,773| B1 |   | 7/2018  | Ogale et al.                           |
| 2010/0169013 | A1 | * | 7/2010 | Nakamura ........... G08G 1/0969 |
|           |    |   |         | 701/469                                |
| 2017/0220876 | A1 | * | 8/2017 | Gao ........................ G06V 10/82 |
| 2018/0189323 | A1 | * | 7/2018 | Wheeler ................. G06F 16/29 |
| 2018/0314921 | A1 |   | 11/2018 | Mercep et al.                         |
| 2018/0345918 | A1 |   | 12/2018 | Foerg et al.                          |
| 2019/0092221 | A1 | * | 3/2019 | Kimura .................... G06F 3/013 |
| 2019/0120946 | A1 | * | 4/2019 | Wheeler ................... G06T 7/13 |
| 2019/0197778 | A1 |   | 6/2019 | Sachdeva et al.                       |

(Continued)

*Primary Examiner* — Rafferty D Kelly
(74) *Attorney, Agent, or Firm* — Botos Churchill IP Law

(57) ABSTRACT

Aspects of the disclosure provide for automatically generating labels for sensor data. For instance, first sensor data for a vehicle may be identified. This first sensor data may have been captured by a first sensor of the vehicle at a first location during a first point in time and may be associated with a first label for an object. Second sensor data for the vehicle may be identified. The second sensor data may have been captured by a second sensor of the vehicle at a second location at a second point in time outside of the first point in time. The second location is different from the first location. A determination may be made as to whether the object is a static object. Based on the determination that the object is a static object, the first label may be used to automatically generate a second label for the second sensor data.

20 Claims, 13 Drawing Sheets

(56) References Cited

U.S. PATENT DOCUMENTS

2019/0228262 A1     7/2019    Gonzalez et al.
2019/0310651 A1    10/2019    Vallespi-Gonzalez et al.
2020/0309923 A1* 10/2020    Bhaskaran .............. G01S 17/87

* cited by examiner

AUTOMATIC LABELING OF OBJECTS IN SENSOR DATA

CROSS REFERENCE TO RELATED APPLICATIONS

The present application is a continuation of U.S. patent application Ser. No. 16/827,835, filed Mar. 24, 2020, the entire disclosure of which is incorporated herein by reference.

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location. Autonomous vehicles are equipped with various types of sensors in order to detect objects in the surroundings. For example, autonomous vehicles may include sonar, radar, camera, LIDAR, and other devices that scan and record data from the vehicle's surroundings.

SUMMARY

Figure 1:
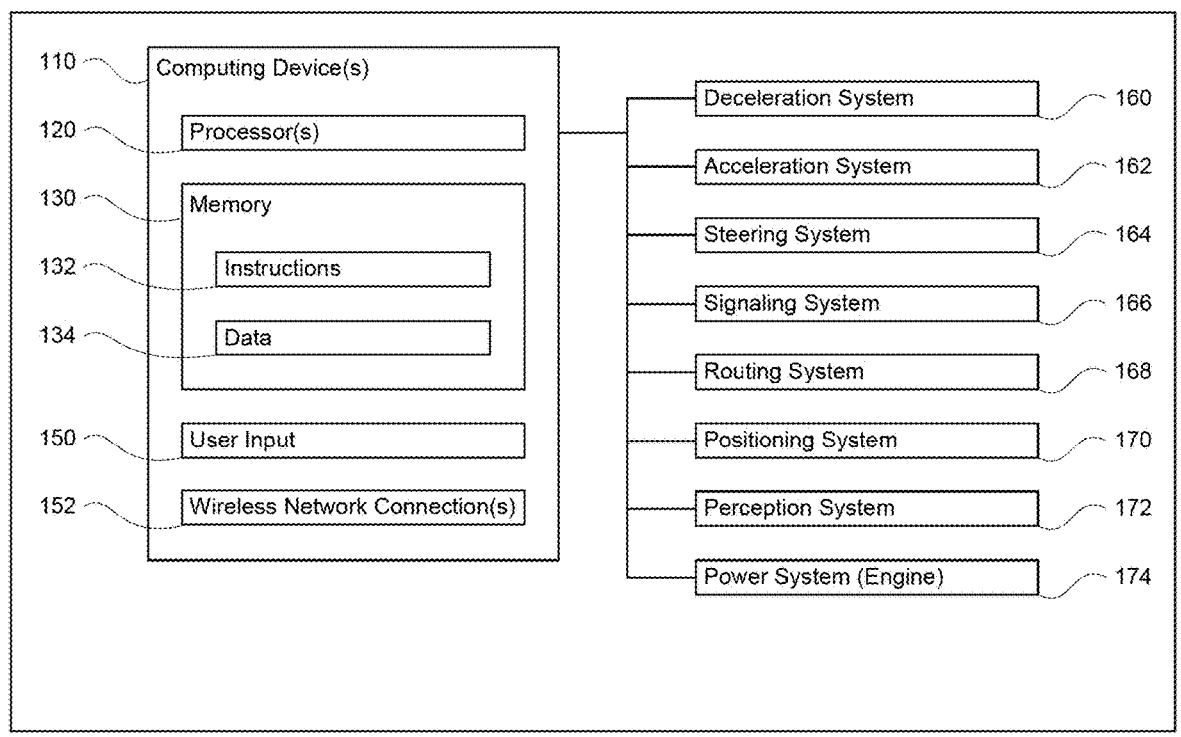
FIG. 1 is a functional diagram of an example vehicle in accordance with an exemplary embodiment.

Aspects of the disclosure provide a method for automatically generating labels for sensor data. The method includes identifying, by one or more processors, first sensor data for a vehicle, wherein the first sensor data was captured by a first sensor of the vehicle at a first location at a first point in time and the first sensor data is associated with a first label for an object; identifying, by the one or more processors, second sensor data, for a vehicle, wherein the second sensor data was captured by a second sensor of the vehicle at a second location at a second point in time different from the first point in time, and the second location being different from the first location; determining, by the one or more processors, that the object is a static object; and based on the determination that the object is a static object, using, by the one or more processors, the first label to automatically generate a second label for the second sensor data.

In one example, the first label is a three-dimensional bounding box identifying a location for the object in the first sensor data. In another example, the first sensor is a LIDAR sensor, the second sensor is a camera, and the second point in time is before the first point in time. In another example, the first sensor is a LIDAR sensor, the second sensor is a camera, and the second point in time is after the first point in time. In another example, the second sensor data includes a set of camera images, and the method further comprises filtering the set of camera images to remove images that do not include the object, and wherein automatically generating the second label includes associating the first label with one or more images of the filtered set of camera images. In another example, the second sensor data includes a set of camera images, and the method also includes projecting a location of the first label into each image of the set of camera images, and filtering the set of camera images to remove images where the projected location is smaller than a given size relative to the camera image in which the projected location was projected and wherein generating the second label includes associating the second label with one or more images of the filtered set of camera images. In another example, the second location is beyond an effective perceptive range of the first sensor. In another example, the second location is beyond a maximum perceptive range of the first sensor. In another example, the first label identifies a location for the object that is beyond an effective perceptive range of the first sensor when the vehicle is at the second location. In another example, the first label identifies a location for the object that is beyond a maximum perceptive range of the first sensor when the vehicle is at the second location. In another example, determining that the object is a static object includes determining that a localized position of the object over an entire period of time that the object is perceived by the first sensor does not change more than a predetermined amount. In another example, determining that the object is a static object includes determining that radar returns for the object between the first point in time and at the second point in time indicate that the object has not moved.

In another example, the method also includes, prior to generating the second label, determining that the object is not occluded with respect to the second sensor at the second point in time. In this example, determining that the object is not occluded includes building a surfel map and casting a ray from the vehicle to a location of the object identified in the object in the second sensor data. Alternatively, determining that the object is not occluded includes providing for display a portion of the first sensor data with a camera image of the second sensor data, wherein the camera image includes a three-dimensional bounding box for the first label projected into two-dimensional space of the camera image and receiving confirmation from a human operator that the object is not occluded. Alternatively, determining that the object is not occluded includes inputting the first label and a camera image of the second sensor data into a machine-learned model.

In another example, the first point in time and the second point in time are at least 0.5 second apart from one another. In another example, the first point in time and the second point in time are at least 0.1 second apart from one another.

Another aspect of the disclosure provides a system for automatically generating labels for sensor data. The system includes one or more computing devices having one or more processors configured to identify first sensor data for a vehicle, wherein the first sensor data was captured by a first sensor of the vehicle at a first location during a first point in time and the first sensor data is associated with a first label for an object; identify second sensor data for the vehicle, wherein the second sensor data was captured by a second sensor of the vehicle at a second location at a second point in time outside of the first point in time, and the second location being different from the first location; determine that the object is a static object; and based on the determination that the object is a static object, use the first label to automatically generate a second label for the second sensor data.

DETAILED DESCRIPTION

Overview

The technology relates to automatically generating labels for objects represented in sensor data. Typical labeling efforts may involve utilizing human operators to create labels which can be time consuming and costly or using complex algorithms for processing the sensor data in order to identify and label objects in the sensor data. Labeling objects may be critical for training neural networks and evaluating performance of an autonomous vehicle as well as its perception system. In some instances, it may be useful to have labels for objects that are within range of all the autonomous vehicle's sensors, but which are not within the fields of view of some of those sensors. For example, it may be useful to have labels for objects that are beyond an effective or current perceptive range of some of an autonomous vehicle's sensors due to weather conditions, occlusions, etc., where such objects would otherwise not be detectable by the vehicle's perception system given the vehicle's current sensors/sensor configuration and any occlusions or weather conditions (e.g. a laser-based sensor may not be able to detect objects at longer distances in fog, rain or snowy conditions) or where such objects would not be perceptible by a human operator reviewing the sensor data. For example, long range camera images may capture objects that are beyond the range of the LIDAR or radar, but the camera images may not provide accurate depth information sufficient, for labeling.

One approach for automatically generating labels may involve an offline process using one or more server computing devices. The process may include identifying first and second sensor data for a vehicle having various systems at different points in time. The first and second sensor data may have been captured by one or more sensors of the vehicle as the vehicle is driven around. In some instances, the vehicle may be an autonomous vehicle and the first sensor data and/or second sensor data may have been captured while the autonomous vehicle is driven in an autonomous driving mode, though this is not necessary. The first and second sensor data may include data points generated by one or more different types of sensors, such as camera images, LIDAR data points, radar data points, sonar data points, audio files (collected via a microphone) etc.

As an example, first sensor data may include data generated by a LIDAR sensor, bounding boxes for objects, as well as one or more associated labels for objects detected by the vehicles perception system or another system which may have processed the sensor data in order to generate the bounding boxes and/or associated labels. The labels may identify information about each object. In addition, each of these labels may be associated with a confidence value indicating how confident the label is considered to be (i.e. how accurate). In addition, the first sensor data may be associated with a first location of the vehicle at which or during the time when the first sensor data was captured Second sensor data captured or generated by the vehicle's perception system at a second point in time at a second location of the vehicle may also be identified. In some instances, the second sensor data may include a plurality of camera images captured by one or more cameras of the vehicle at the second point in time.

In this regard, labels from the LIDAR data points of the first sensor data may be "transferred" to one or more camera images of the second sensor data. In other words, a first label from the first sensor data may be used to automatically generate a second label for the second sensor data, by simply associating the first label with the second sensor data. This may be especially useful as the visible range in a camera image may go well beyond the effective perceptive range of the LIDAR data. However, transferring labels to moving objects may present all sorts of distortions to the data.

To avoid these issues and prevent label transfer errors, prior to transferring any labels, the server computing devices may determine whether a label is associated with a static object. In the case of a moving vehicle passing a static object, the labels can be extended outside the range of the first or second sensor data. This may provide numerous opportunities for training and improving perception system and other software Labels of the first sensor data may then be transferred, used to generate new labels, or otherwise associated with the second sensor data such that static objects of the second sensor data are now labeled. In this regard, the objects of the second sensor data can be automatically labeled without requiring the first sensor data to be processed using object detection systems of the vehicle or even human operators. These "transferred" labels for the second sensor data as well as the second sensor data itself may then be stored and used for various purposes including estimating accuracy of labels as well as training machine learning models including neural networks and other models. For instance, as noted above, there may be labels for well beyond the maximum perceptive range for a particular sensor, such as a LIDAR sensor. In such cases, models may be trained and evaluate the perception system of the vehicle which may use data from other types of sensors (such as cameras and radar) to infer the presence of objects beyond the maximum perceptive range for the particular sensor. In addition, this maximum perceptive range can be reduced in certain situations, such as in bad weather where there is fog, snow, rain, etc., and the ability to obtain labels in such conditions even at more reasonable ranges especially useful. In addition, having additional labels with additional details about various objects may be used to improve the accuracy of such models and thereby reduce false positives (detection of an object that does not exist) as well as false negatives (failure to detect an object when one exists).

The features described herein may enable the automatic generation of highly-accurate three-dimensional labels for sensor data with very little costs in terms of time or processing power. By transferring labels generated by different sensors of a vehicle at different times with different positions and orientations, sensor data can be labeled for objects which may otherwise have not been detected in the second sensor data as they may have been beyond the vehicle's effective perceptive range or occluded at the second point in time due to other objects or weather conditions. Further, in some situations labels generated for the first sensor data by the vehicle's perception system at the first point in time may have lower confidence values due to factors such as distance to the object or whether the object was partially occluded. In situations in which the vehicle may have been closer to the object or have a better perspective view of that object at the first point in time, the labels generated by the vehicle at the first point in time may have a higher confidence than labels generated by the vehicle at the second point in time. Therefore, transferring the labels from the first sensor data for the first point in time to the second sensor data at the second point in time, may provide labels for the second sensor data that have higher confidence than the labels directly generated for the second sensor data.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

The computing devices 110 may also be connected to one or more speakers 112 as well as one or more user inputs 114. The speakers may enable the computing devices to provide audible messages and information, such as the alerts described herein, to occupants of the vehicle, including a driver. In some instances, the computing devices may be connected to one or more vibration devices configured to vibrate based on a signal from the computing devices in order to provide haptic feedback to the driver and/or any other occupants of the vehicle. As an example, a vibration device may consist of a vibration motor or one or more linear resonant actuators placed either below or behind one or more occupants of the vehicle, such as embedded into one or more seats of the vehicle.

The user input may include a button, touchscreen, or other devices that may enable an occupant of the vehicle, such as a driver, to provide input to the computing devices 110 as described herein. As an example, the button or an option on the touchscreen may be specifically designed to cause a transition from the autonomous driving mode to the manual driving mode or the semi-autonomous driving mode.

In one aspect the computing devices 110 may be part of an autonomous control system capable of communicating with various components of the vehicle in order to control the vehicle in an autonomous driving mode. For example, returning to FIG. 1, the computing devices 110 may be in communication with various systems of vehicle 100, such as deceleration system 160, acceleration system 162, steering system 164, routing system 166, planning system 168, positioning system 170, and perception system 172 in order to control the movement, speed, etc. of vehicle 100 in accordance with the instructions 132 of memory 130 in the autonomous driving mode.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle.

Planning system 168 may be used by computing devices 110 in order to determine and follow a route generated by a routing system 166 to a location. For instance, the routing system 166 may use map information to determine a route from a current location of the vehicle to a drop off location. The planning system 168 may periodically generate trajectories, or short-term plans for controlling the vehicle for some period of time into the future, in order to follow the route (a current route of the vehicle) to the destination. In this regard, the planning system 168, routing system 166, and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. In addition, the map information may identify area types such as constructions zones, school zones, residential areas, parking lots, etc.

The map information may include one or more roadgraphs or graph networks of information such as roads, lanes, intersections, and the connections between these features which may be represented by road segments. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Figure 2:
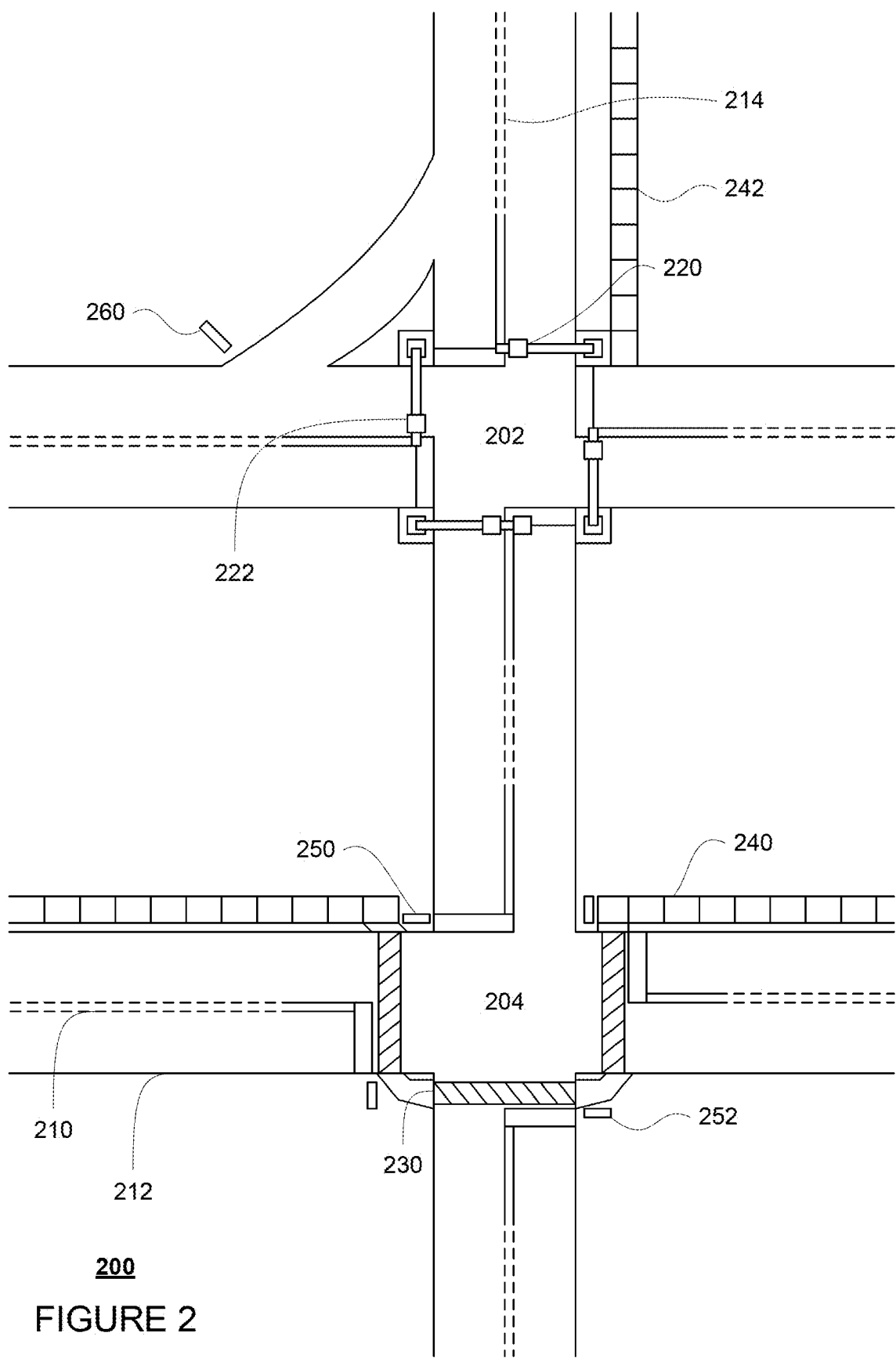
FIG. 2 is an example of map information in accordance with aspects of the disclosure.

FIG. 2 is an example of map information 200 for a section of roadway including intersections 202, 204. The map information 200 may be a local version of the map information stored in the memory 130 of the computing devices 110. Other versions of the map information may also be stored in the storage system 450 discussed further below. In this example, the map information 200 includes information identifying the shape, location, and other characteristics of lane lines 210, 212, 214, traffic lights 220, 222, crosswalks 230, 232, sidewalks 240, stop signs 250, 252, and yield sign 260. In this regard, the map information includes the three-dimensional (3D) locations of traffic lights 220, 222 as well as information identifying the lanes which are controlled by these traffic lights.

While the map information is depicted herein as an image-based map, the map information need not be entirely image based (for example, raster). For example, the map information may include one or more roadgraphs or graph networks of information such as roads, lanes, intersections, and the connections between these features which may be represented by road segments. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with the computing devices of the computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

Figure 3:
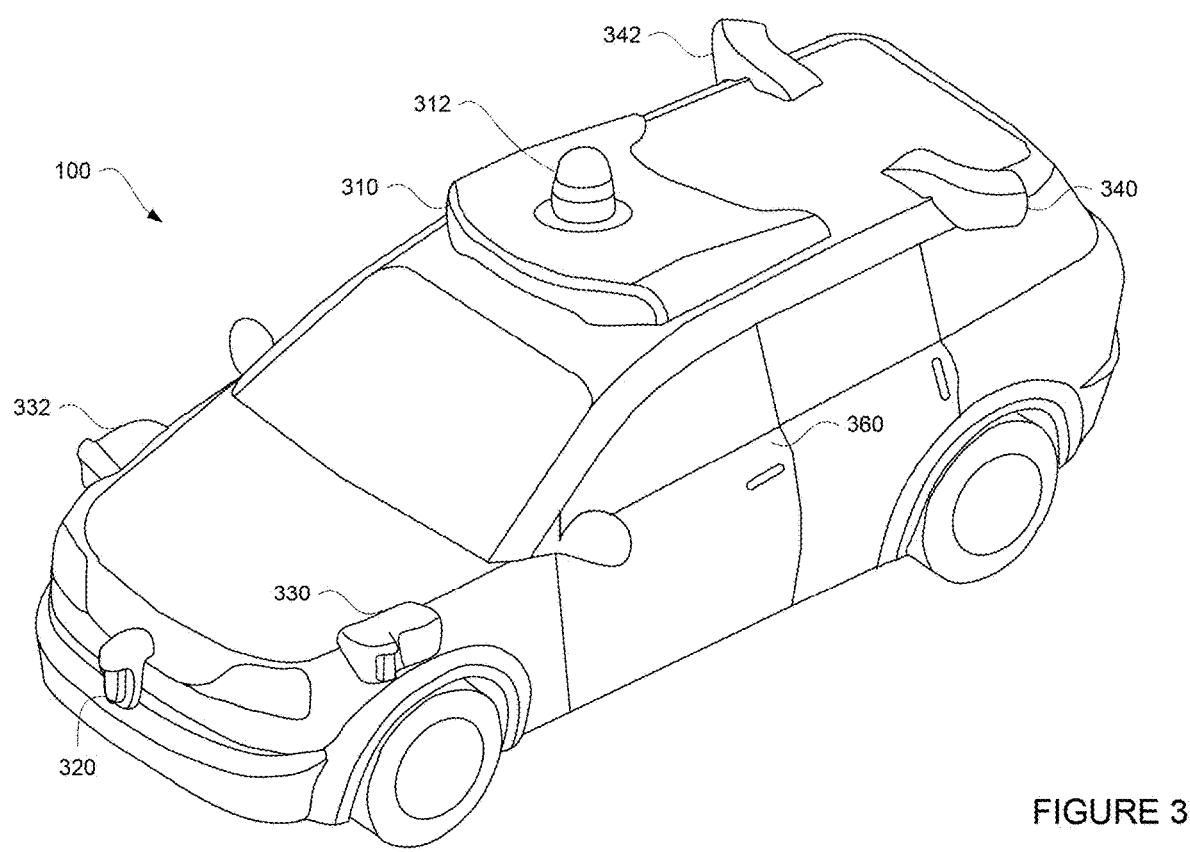
FIG. 3 is an example diagram of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by the computing devices of the computing devices 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The computing devices 110 may be capable of communicating with various components of the vehicle in order to control the movement of vehicle 100 according to primary vehicle control code of memory of the computing devices 110. For example, returning to FIG. 1, the computing devices 110 may include various computing devices in communication with various systems of vehicle 100, such as deceleration system 160, acceleration system 162, steering system 164, routing system 166, planning system 168, positioning system 170, perception system 172, and power system 174 (i.e. the vehicle's engine or motor) in order to control the movement, speed, etc. of vehicle 100 in accordance with the instructions 132 of memory 130.

The various systems of the vehicle may function using autonomous vehicle control software in order to determine how to and to control the vehicle. As an example, a perception system software module of the perception system 172 may use sensor data generated by one or more sensors of an autonomous vehicle, such as cameras, LIDAR sensors, radar units, sonar units, etc., to detect and identify objects and their features. These features may include location, type, heading, orientation, speed, acceleration, change in acceleration, size, shape, etc. In some instances, features may be input into a behavior prediction system software module which uses various behavior models based on object type to output a predicted future behavior for a detected object.

In other instances, the features may be put into one or more detection system software modules, such as a traffic light detection system software module configured to detect the states of known traffic signals, a school bus detection system software module configured to detect school busses, construction zone detection system software module configured to detect construction zones, a detection system software module configured to detect one or more persons (e.g. pedestrians) directing traffic, a traffic accident, detection system software module configured to detect a traffic accident, an emergency vehicle detection system configured to detect emergency vehicles, etc. Each of these detection system software modules may input sensor data generated by the perception system 172 and/or one or more sensors (and in some instances, map information for an area around the vehicle) into various models which may output a likelihood of a certain traffic light state, a likelihood of an object being a school bus, an area of a construction zone, a likelihood of an object being a person directing traffic, an area of a traffic accident, a likelihood of an object being an emergency vehicle, etc., respectively.

Detected objects, predicted future behaviors, various likelihoods from detection system software modules, the map information identifying the vehicle's environment, position information from the positioning system 170 identifying the location and orientation of the vehicle, a destination for the vehicle as well as feedback from various other systems of the vehicle may be input into a planning system software module of the planning system 168. The planning system may use this input to generate trajectories for the vehicle to follow for some brief period of time into the future based on a current route of the vehicle generated by a routing module of the routing system 166. A control system software module of the computing devices 110 may be configured to control movement of the vehicle, for instance by controlling braking, acceleration and steering of the vehicle, in order to follow a trajectory.

Computing devices 110 may also include one or more wireless network connections 152 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using, communication protocols proprietary to one or more companies, Ethernet, WiFi and HTTP, and various combinations of the foregoing.

The computing devices 110 may control the vehicle in an autonomous driving mode by controlling various components. For instance, by way of example, the computing devices 110 may navigate the vehicle to a destination location completely autonomously using data from the detailed map information and planning system 168. The computing devices 110 may use the positioning system 170 to determine the vehicle's location and perception system 172 to detect and respond to objects when needed to reach the location safely. Again, in order to do so, computing device 110 may generate trajectories and cause the vehicle to follow these trajectories, for instance, by causing the vehicle to accelerate (e.g., by supplying fuel or other energy to the engine or power system 174 by acceleration system 162), decelerate (e.g., by decreasing the fuel supplied to the engine or power system 174, changing gears, and/or by applying brakes by deceleration system 160), change direction (e.g., by turning the front or rear wheels of vehicle 100 by steering system 164), and signal such changes (e.g. by using turn signals). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
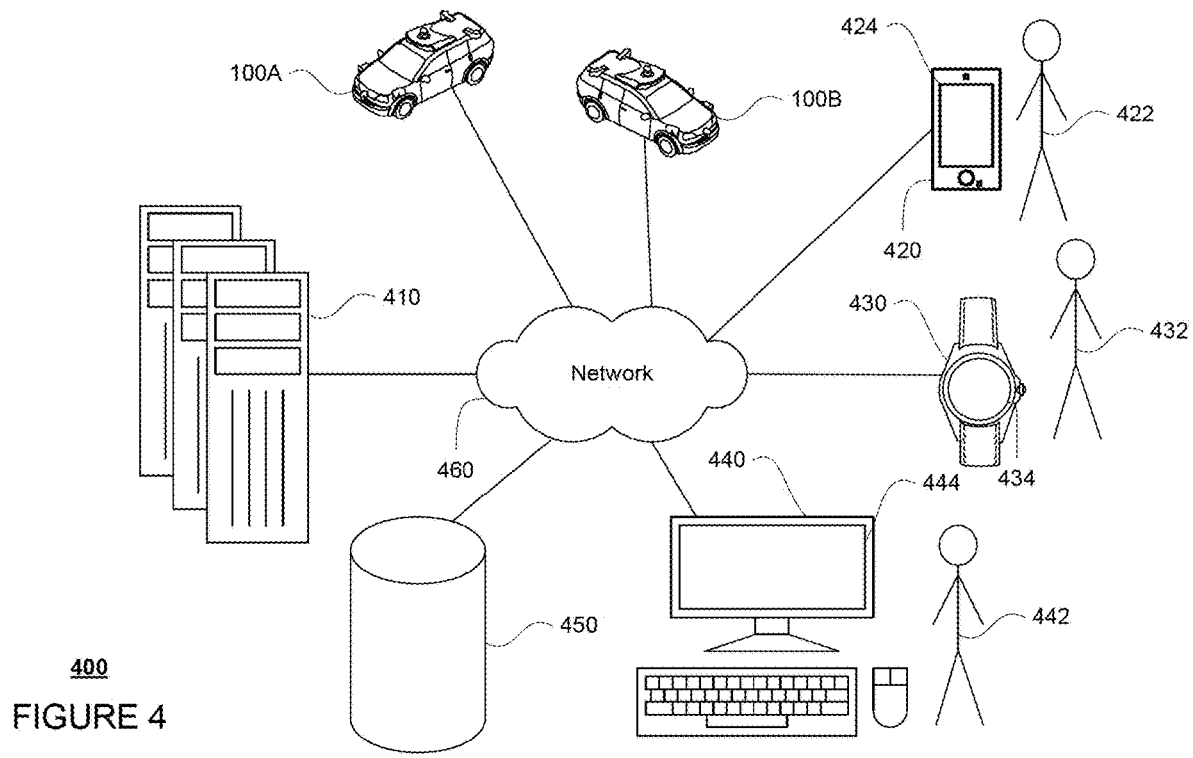
FIG. 4 is an example pictorial diagram of a system in accordance with aspects of the disclosure.
Figure 5:
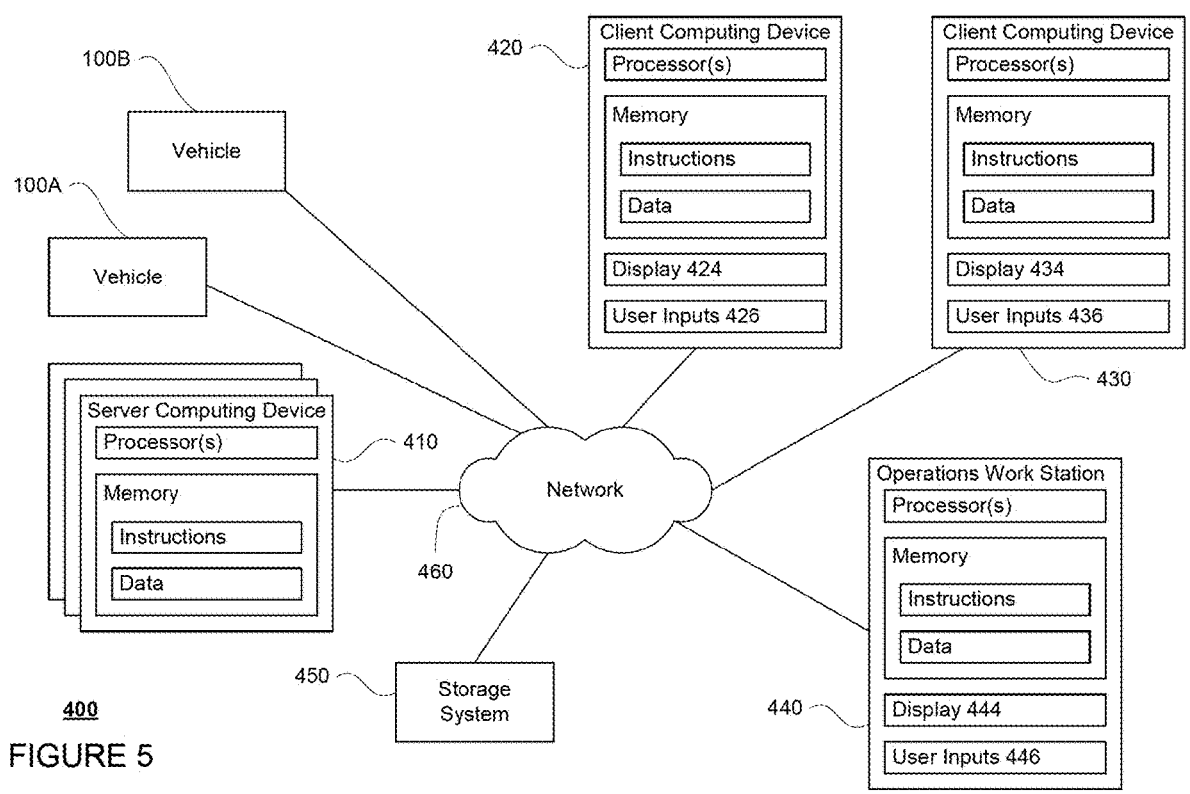
FIG. 5 is an example functional diagram of a system in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicles 100A, 100B which may be configured the same as or similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A as well as computing devices 420, 430, 440 via the network 460. For example, vehicles 100, 100A, may be a part of a fleet of vehicles that can be dispatched by server computing devices to various locations. In this regard, the server computing devices 410 may function as a validation computing system which can be used to validate autonomous control software which vehicles such as vehicle 100 and vehicle 100A may use to operate in an autonomous driving mode. In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

In some examples, client computing device 440 may be an operations workstation used by an administrator or operator to review scenario outcomes, handover times, and validation information as discussed further below. Although only a single operations workstation 440 is shown in FIGS. 4 and 5, any number of such work stations may be included in a typical system. Moreover, although operations workstation is depicted as a desktop computer, operations workstations may include various types of personal computing devices such as laptops, netbooks, tablet computers, etc.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information as described in more detail below. This information may be retrieved or otherwise accessed by a server computing device, such as one or more server computing devices 410, in order to perform some or all of the features described herein. For instance, storage system 450 may store sensor data. This sensor data may include, for instance, sensor data generated by various sensors of a perception system, such as perception system 172 of vehicle 100. As an example, the sensor data may include raw sensor data as well as one or more labels identifying defining characteristics of perceived objects such as bounding boxes, shape, location, orientation, speed, etc. of objects such as vehicles, pedestrians, bicyclists, vegetation, curbs, lane lines, sidewalks, crosswalks, buildings, etc. The sensor data may also include information identifying the location and point in time during or point in time at which the sensor data was captured.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 13:
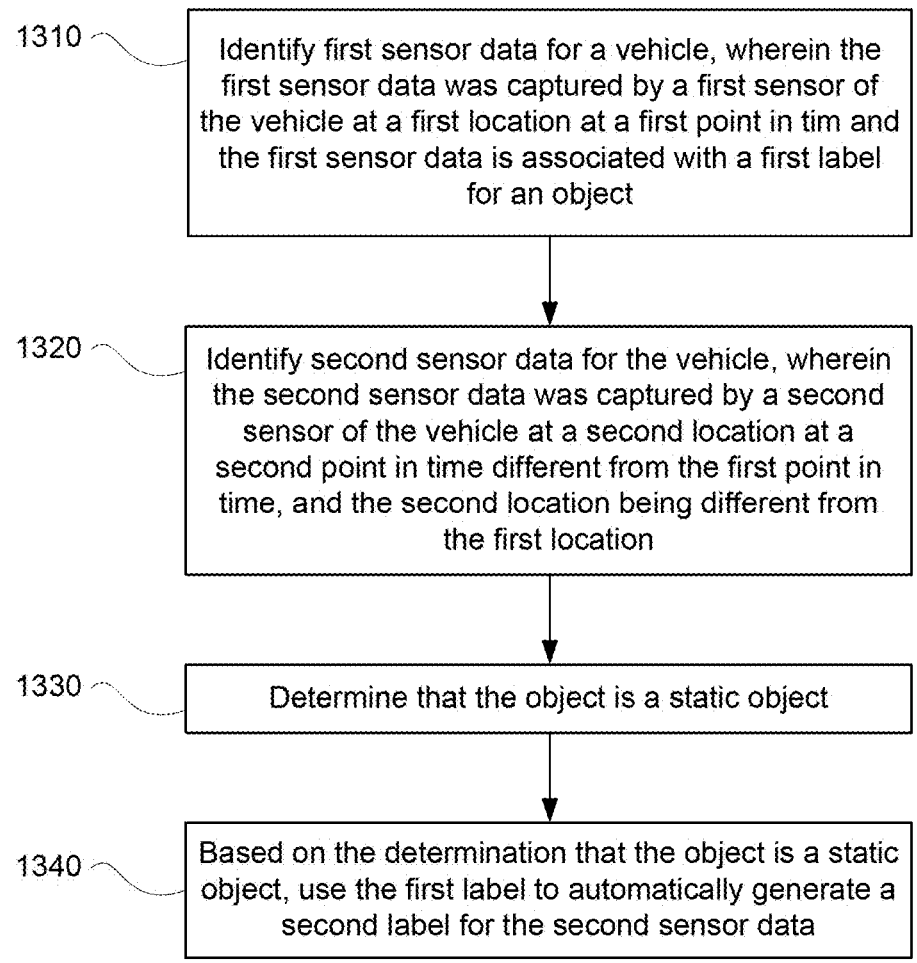
FIG. 13 is an example flow diagram in accordance with aspects of the disclosure.

FIG. 13 includes an example flow diagram 1300 of some of the examples for automatically generating labels for sensor data, which may be performed by one or more processors such as processors of computing devices 410. For instance, at block 1310, first sensor data for a vehicle is identified. The first sensor data was captured by a first sensor of the vehicle at a first location at a first point in time and the first sensor data is associated with a first label for an object. At block 1320, second sensor data for a vehicle is identified. The second sensor data was captured by a second sensor of the vehicle at a second location at a second point in time outside of the first point in time, and the second location being different from the first location.

For instance, in order to automatically generate labels, the server computing devices 410 may access first and second sensor data from the storage system 450. The first and second sensor data may have been captured by one or more sensors of a vehicle, such as vehicle 100, as the vehicle is driven around. In some instances, the first sensor data and/or second sensor data may have been captured while the autonomous vehicle is driven in an autonomous driving mode, though this is not necessary. The first and sensor data may include data points generated by one or more different types of sensors, such as camera images, LIDAR data points, radar data points, sonar data points, audio files (collected via a microphone) etc. of the perception system 172.

Figure 6:
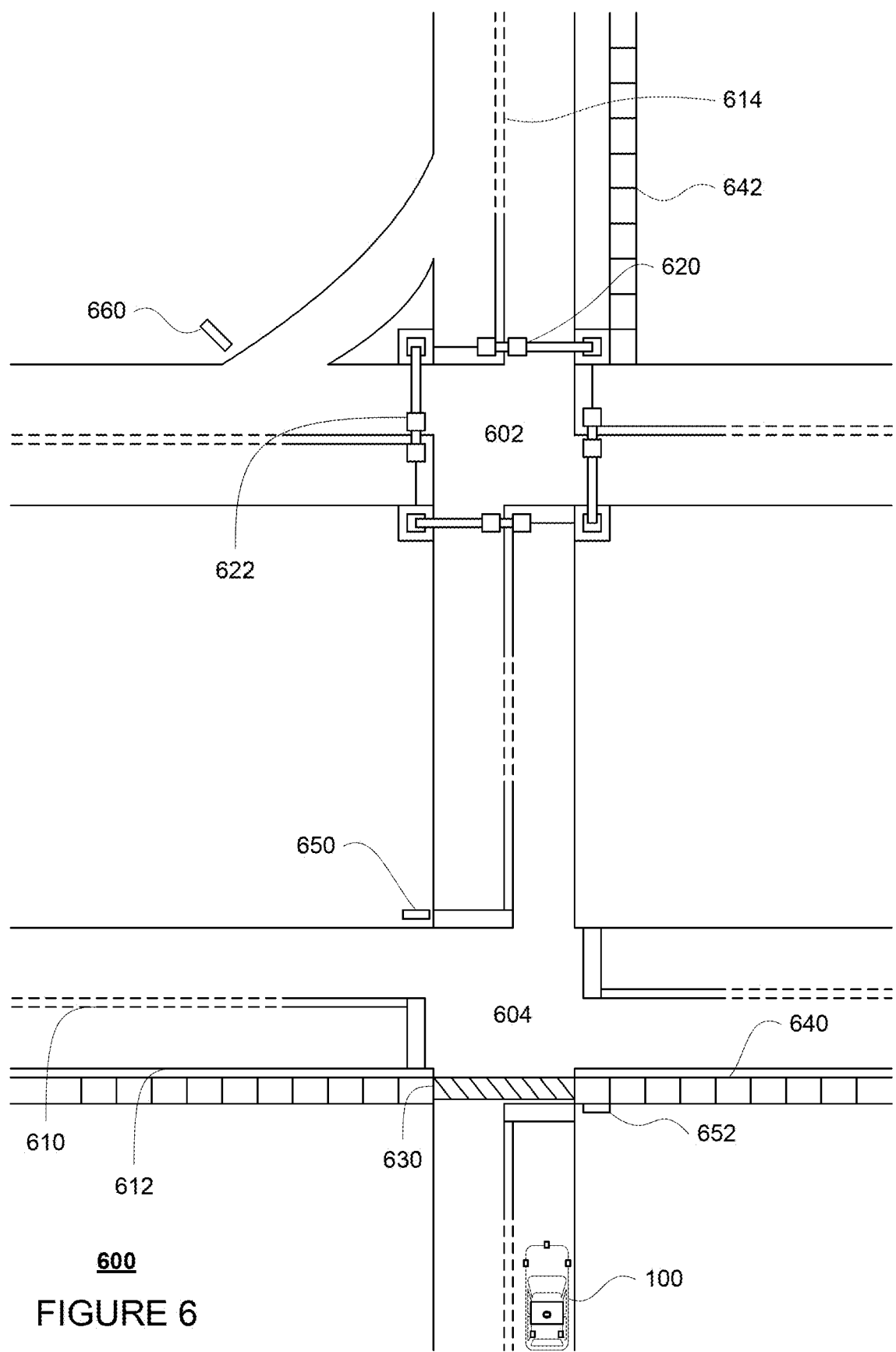
FIG. 6 is an example of a section of roadway and a vehicle in accordance with aspects of the disclosure.

FIG. 6 depicts vehicle 100 being maneuvered on a section of roadway 600 including intersections 602, 604. In example of FIG. 6, intersections 602 and 604 correspond to intersections 202 and 204 of the map information 200, respectively. In this example, lane lines 610, 612, 614 correspond to the shape, location, and other characteristics of lane lines 210, 212, 214, respectively. Similarly, crosswalk 630 corresponds to the shape, location, and other characteristics of crosswalk 230, respectively; sidewalks 640, 642 correspond to sidewalks 240, 242; traffic lights 620, 622 correspond to traffic lights 220, 222, respectively; stop signs 650, 652 correspond to stop signs 250, 252, respectively; and yield sign 660 corresponds to yield sign 260.

In one example, the first sensor data may represent a first point in time within a finite period of time or timeframe, such as 100 milliseconds or more or less, during which the first sensor data would have been captured or generated by the vehicle's perception system. For example, the first sensor data may include data generated during a single spin of laser-based (e.g. LIDAR) sensor which rotates 360 degrees such as the LIDAR sensor of housing 312. In this regard, the first sensor data may be associated with the first point in time and/or a timeframe during which the first sensor data was captured and/or generated. The point in time may be determined using GPS timing signals. At some point, the first sensor data may be transferred from the vehicle 100 to the storage system 450, for instance, by uploading over a wireless connection or by using a wired connection.

Figure 7:
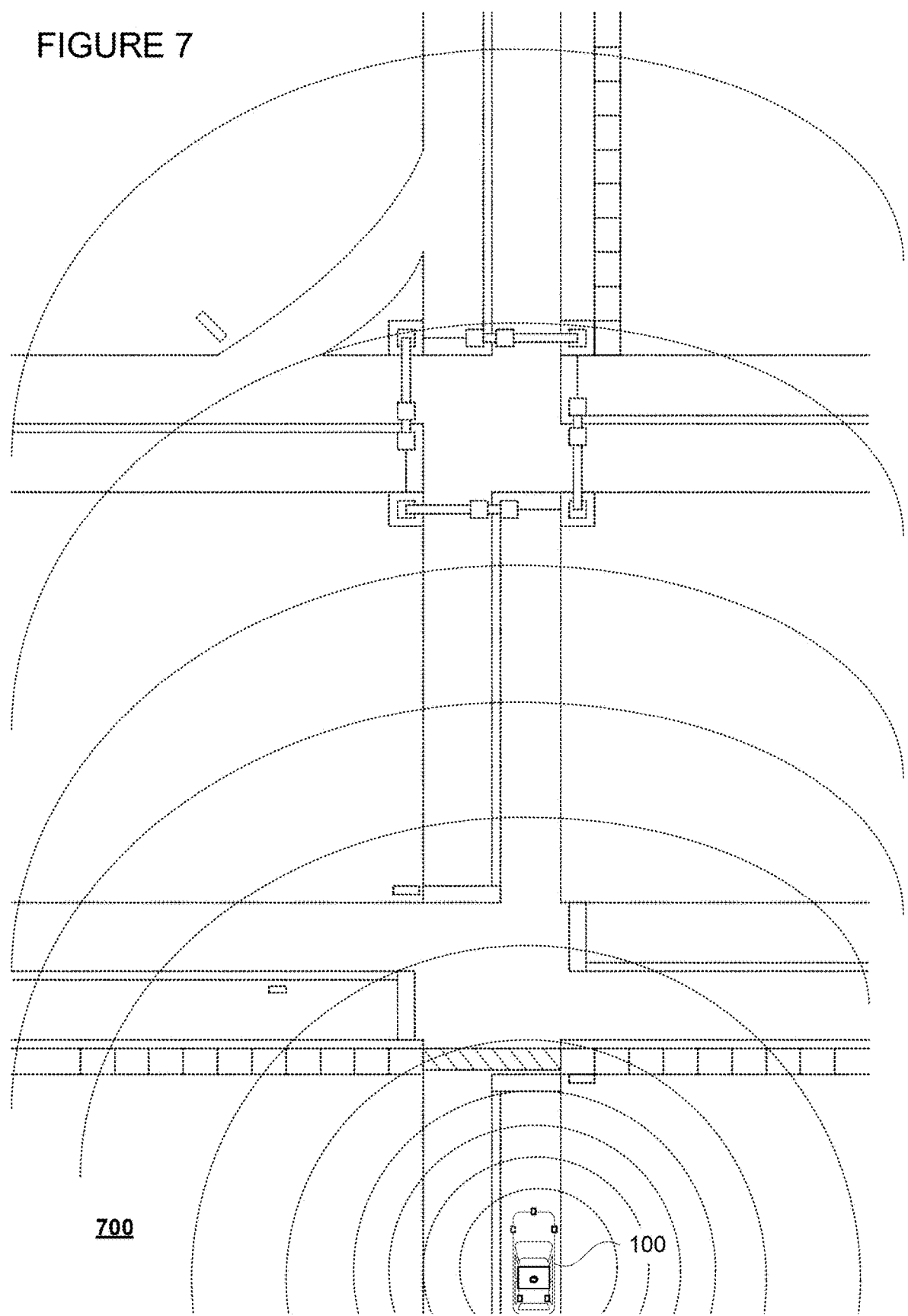
FIG. 7 is an example representation of LIDAR sensor data in accordance with aspects of the disclosure.

FIG. 7 is an example representation of LIDAR sensor data 700, for example, first sensor data for a first point in time corresponding to the point in time and location of the vehicle 100 as presented in FIG. 6. In this example, the dotted lines represent LIDAR sensor data or rather LIDAR returns representing both intensity and location data for the area corresponding to the section of roadway 600.

Figure 8:
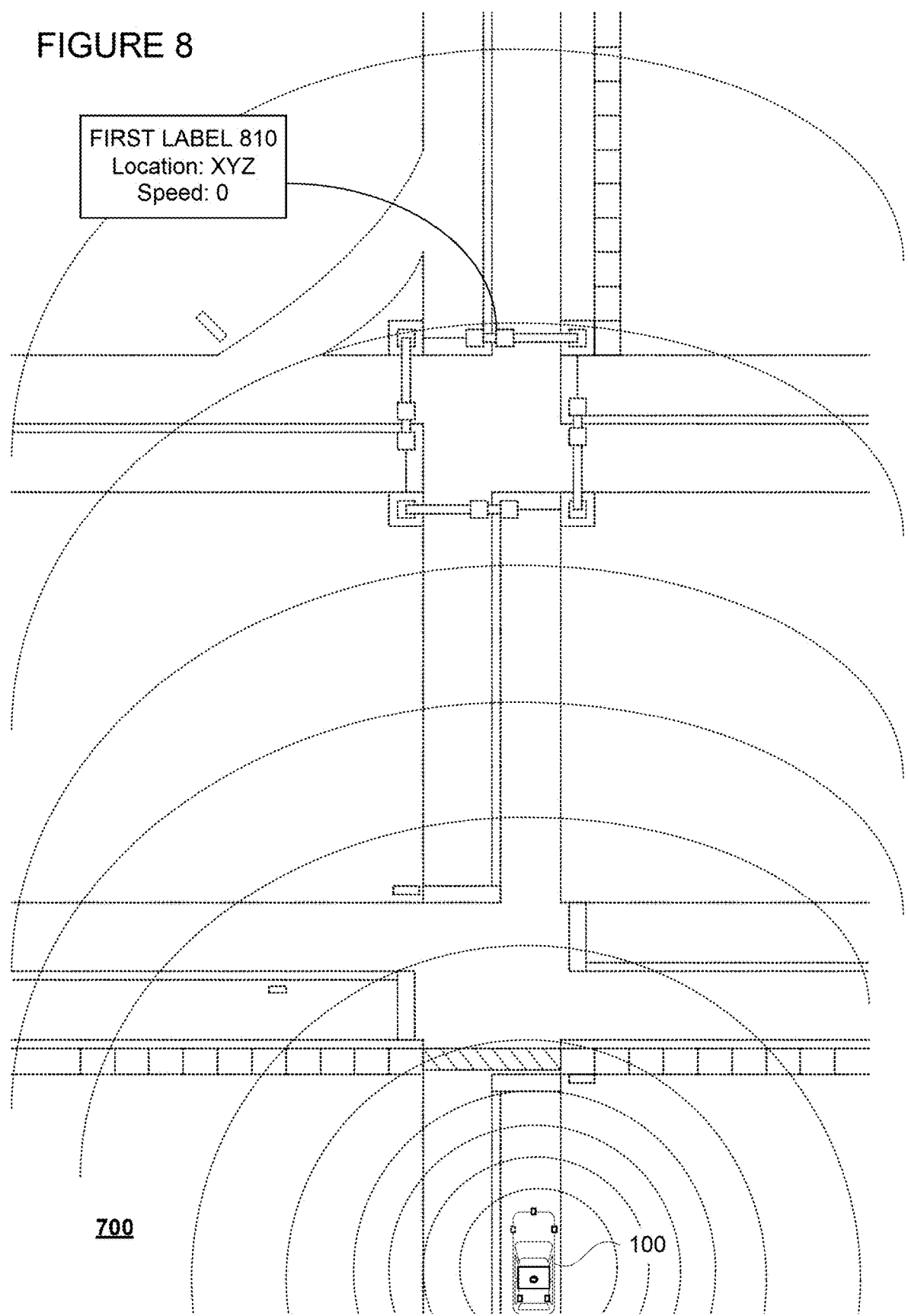
FIG. 8 is an example representation of LIDAR sensor data and a first label in accordance with aspects of the disclosure.

As noted above, the first sensor data may include bounding boxes, as well as one or more associated labels for objects detected by the vehicles perception system or another system which may have processed the sensor data in order to generate the bounding boxes and/or associated labels. The bounding boxes may represent a three-dimensional space that includes all of the data points generated by a given sensor corresponding to an object. The labels may identify information about each object such as its location ("location labels"), orientation, heading, speed, rate of acceleration, rate of deceleration, type (e.g. vehicle, bicyclist, pedestrian, construction object, etc.), timestamp, as well as other information such as turn signals states (e.g. on or off, left or right, etc.), body pose, door open, gaze direction (of a driver, passenger, pedestrian, bicyclist, etc.), hand gesture classifications, whether a light is flashing, etc. where applicable. Again, this timestamp may be generated using GPS data. In addition, each of these labels may be associated with a confidence value indicating how confident the label is considered to be (i.e. how accurate). FIG. 8 is an example representation of LIDAR sensor data 700 with an example first label 810. In this example, the example label identifies the location and speed of an object corresponding to the traffic light 620.

In addition as noted above, the first sensor data may be associated with a first location and/or orientation or heading of the vehicle at which or at first point in time when the first sensor data was captured. In the example of FIGS. 7 and 8, the first location and heading may correspond to the location and heading of vehicle 100 as depicted in FIGS. 6, 7 and 8. This first location may be defined in both GPS coordinates (e.g. latitude, longitude, altitude) as well as in a smooth coordinate system or a local frame. The heading information may be an angle defined relative to a particular direction, such as North. Of course, the location information may also be much more complex, and may include additional information such as wheel odometry and matching laser data to a prior 3D map, etc. This local frame may be established each time the vehicle is turned on and/or the autonomous driving mode is activated. In this regard, the local frame may be a Euclidean coordinate system where the origin of the local frame may be the location of the vehicle at the time when the vehicle was last turned on and where positive x direction corresponds to East, positive y direction corresponds to North, and the z direction corresponds to the vehicle's elevation. Again, in the local frame, the heading information may be an angle defined relative to a particular direction, such as North or the x direction.

Second sensor data captured or generated by a sensor of the perception system 172 at a second point in time at a second location and/or orientation of the vehicle 100 may also be identified. As such, the first sensor data and second sensor data may be generated by different sensors of the same vehicle when the vehicle is at a different location and/or orientation. In addition, the second point in time may be different from the first point in time. The minimum difference between the first and second points in time may be determined based on any number of different metrics, including for example, a difference corresponding to the frequency of the LIDAR sensor used to capture the first sensor data. For example, if the frequency of the LIDAR sensor is 10 Hz (or 10 revolutions per second) the minimum difference between the first and second points in time may be 0.1 second. Of course, the first and second points in time may be more or less than 0.1 second apart from one another. For example, the first and second points in time may be at least 0.05 second, 0.5 second, 1 second, 5 seconds, and so on, apart from one another so long as the object from which a label is to be transferred is static during that time or as long as the object is observed as discussed above. Of course, the greater the difference between the first and second points in time, the more useful any transferred labels may be.

Figure 9:
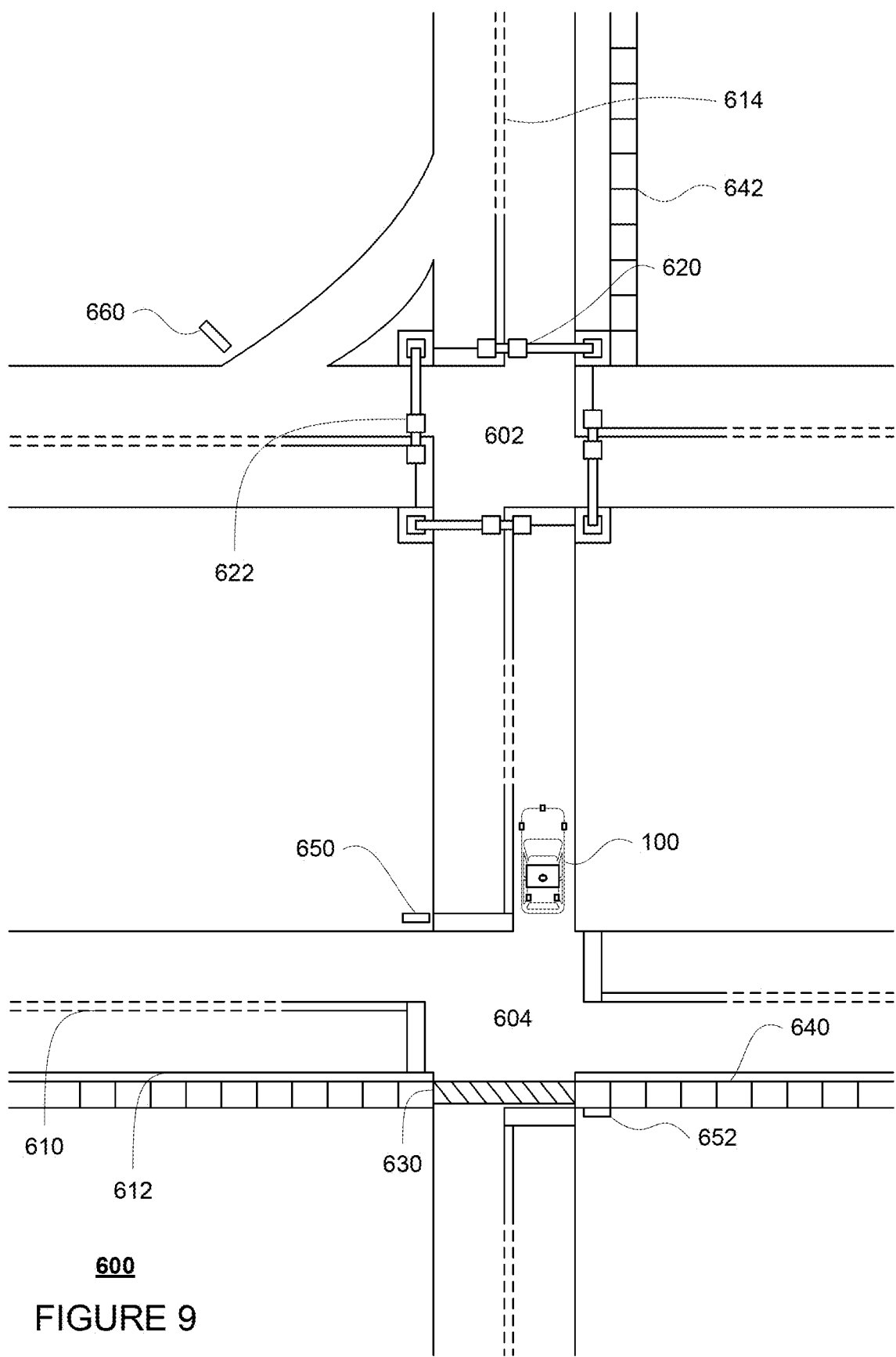
FIG. 9 is an example of a section of roadway and a vehicle in accordance with aspects of the disclosure.

The second location may be defined in both GPS coordinates (e.g. latitude, longitude, altitude) as well as in a smooth coordinate system or a local frame. Again, in either frame, the heading information may be an angle defined relative to a particular direction, such as North or the x direction. Of course, the location information may also be much more complex, and may include additional information such as wheel odometry and matching laser data to a prior 3D map, etc. As with the first sensor data at some point, the second sensor data may be transferred from the vehicle 100 to the storage system 450, for instance, by uploading over a wireless connection or by using a wired connection. FIG. 9 depicts vehicle 100 being maneuvered on the section of roadway 600 at a second point in time that occurs after the first point in time. In this example, the vehicle 100 has moved closer to the intersection 602.

The second point in time may be before or after the first point in time. The second point in time may be selected based upon the location of an object relative of the location of the vehicle. For instance, a maximum range may be used based upon the sensor data to which labels are to be transferred. For example, the location or bounding box for the object is not useful to a camera image if the object is 1000 meters away from the location of the vehicle (or rather the camera) because the object will likely be too small in the image to recognize. In this regard, labels may be "transferred" forward or backwards in time. In this regard, although the example of FIG. 10 provides an image captured at a point in time that is after the first point in time, other images captured before the first point in time may also be automatically labeled in a similar way.

In some instances, the second sensor data may include a plurality of camera images captured by one or more cameras of the vehicle 100 at the second point in time. Many of these images may not actually include the object or the object may be too far away to be perceptible in the camera image and thus, may not actually be considered usable. One or more usable camera images may be identified by projecting a three-dimensional (3D) bounding box of a label into the 2D space of the camera image. A 3D bounding box may represent a 3D shape such as a cube, cuboid, sphere, cylinder, or other shape which bounds sensor data for an object such as 3D lidar sensor points generated by a LIDAR sensor, radar data points generated by a radar sensor, etc. If the 3D bounding box is not within the plane of the camera image or if the projection of the bounding box is too small or smaller than a given size relative to the camera image (e.g. too few pixels in the image), the camera image may be discarded. This projection may be performed based on the pose of the vehicle when the second sensor data was captured and the location associated with the bounding box.

Figure 10:
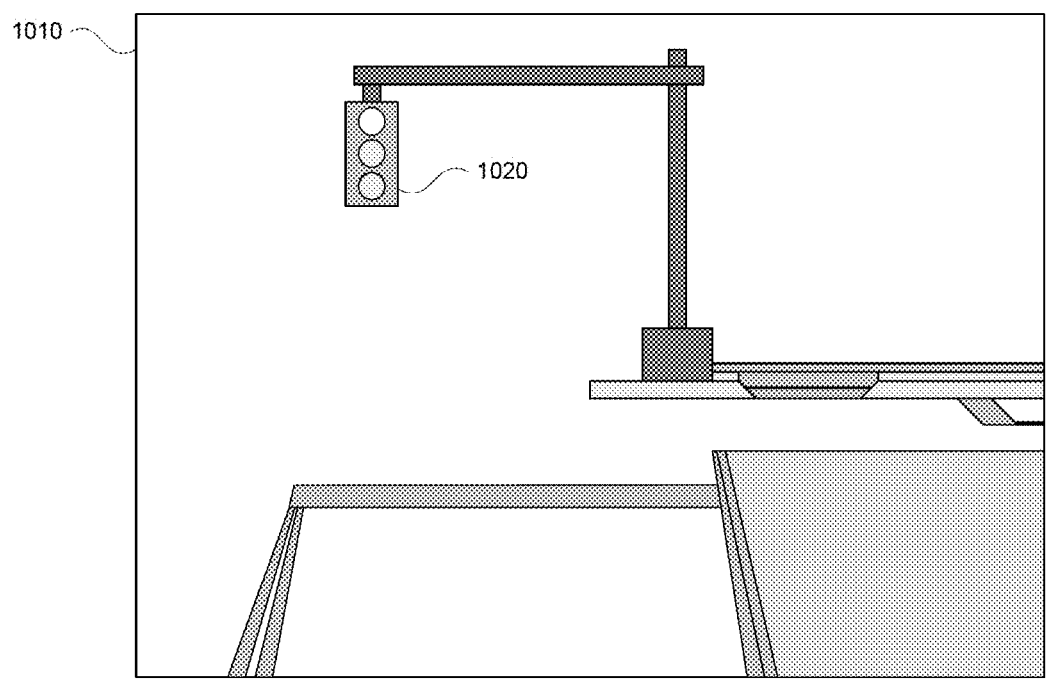
FIG. 10 is an example image in accordance with aspects of the disclosure.
Figure 11:
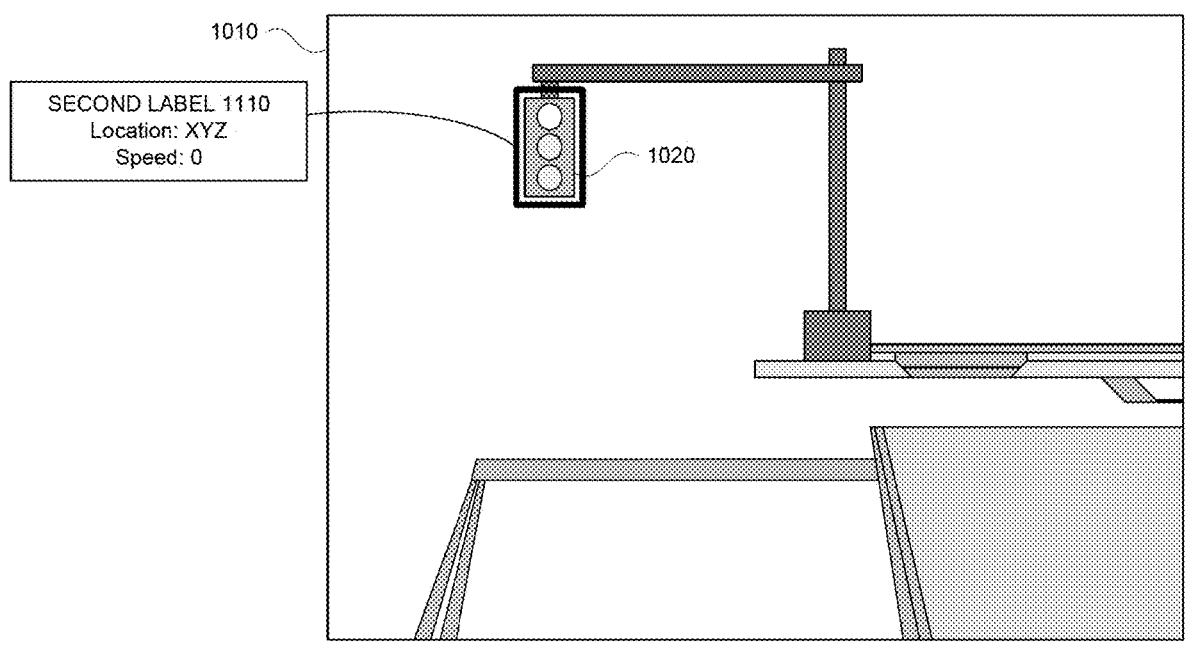
FIG. 11 is an example image and second label in accordance with aspects of the disclosure.

FIG. 10 is an example representation of a camera image 1010, for example, second sensor data for a second point in time corresponding to the point in time and location of the vehicle 100 as presented in FIG. 9. In this example, the image captures a traffic light 1020 corresponding to the traffic light 620.

Labels from the LIDAR data points of the first sensor data may be "transferred" by the one or more server computing devices 410 to the one or more camera images of the second sensor data. In other words, a first label from the first sensor data may be used to automatically generate a second label for the second sensor data, by simply associating the first label with the second sensor data. This may be especially useful as the visible range in a camera image may go well beyond the effective perceptive range of the LIDAR data. However, transferring labels to moving objects may present all sorts of distortions to the data.

Returning to FIG. 13, at block 1330, that the object is a static object is determined. For instance, to avoid the aforementioned issues and prevent label transfer errors, prior to "transferring" any labels, the server computing devices 410 may determine whether a first label from the first sensor data is associated with a static object. An object may be determined to be static if the localized position of that object over the entire time that the object is perceived by a LIDAR sensor of the perception system does not change or rather only changes to a predetermined amount such as a very slight degree (e.g. within an error of the perception system's localization of the object). In another example, if the server computing devices are only able to determine that the object is static for a portion of time (e.g., from point in time A to point in time B), then labels can be transferred between any first and second points in time bounded by the points in time A and B. In addition or alternatively, radar returns or labels generated from radar returns for the object may be evaluated between the first point in time and the second point in time. If there is any movement of the object detected between these points in time, the object would not be static. In the example depicted in FIG. 8, the first label 810 identifies the traffic light 620 as a static object. Thus, the server computing devices 410 may determine that it is appropriate to automatically generate a label for the camera image 1010 using the first label 810. Although the example of a static object as presented herein is a traffic light, many other types of objects may be identified as static objects and used to automatically generated labels, such as vehicles, pedestrians, bicyclists, vegetation, curbs, lane lines, sidewalks, crosswalks, buildings, etc.

Returning to FIG. 13, at block 1340, based on the determination that the object is a static object, the first label is used to automatically generate a second label for the second sensor data. The labels may be "transferred" by the server computing devices in either the local frame of the vehicle (assuming the frame has not changed between the first and second points in time) or the GPS locations and orientations (pose) of the vehicle at the first and second points in time. For instance, the three-dimensional location and orientation of the first label may be transformed into the two or three-dimensional space of the second sensor data using the pose of the vehicle and/or location of the second sensor at the time the second sensor data was captured in order to generate a second label for the second sensor data. Alternatively, a registration approach may be used to try to find a rigid transform that aligns the first and second sensor data at once. This may also correct for any errors in the estimated positions and/or orientations of the vehicle at the first and second points in time. The location labels may then be converted to the local frame coordinates of the second sensor data (e.g. the camera image) using the conversion. For instance, the difference may be subtracted from each of the location labels resulting in location labels which are now in the local frame coordinates of the second sensor data.

The converted location labels and other labels of the first sensor data may then be transferred, used to generate new labels, or otherwise associated with the second sensor data such that static objects of the second sensor data are now labeled. In this regard, the objects of the second sensor data can be automatically labeled by the server computing devices 410 without requiring the first sensor data to be processed using object detection systems of the vehicle or even human operators. These "transferred" labels for the second sensor data may then be stored and used for various purposes. For example, turning to FIGURE II, the first label 810 has been used to generate a second label 1110 for the camera image 1010. For example, the three-dimensional location of the first label (xyz) may be projected into the two-dimensional space of the camera image 1010 in order to generate the second label 1110.

Figure 12:
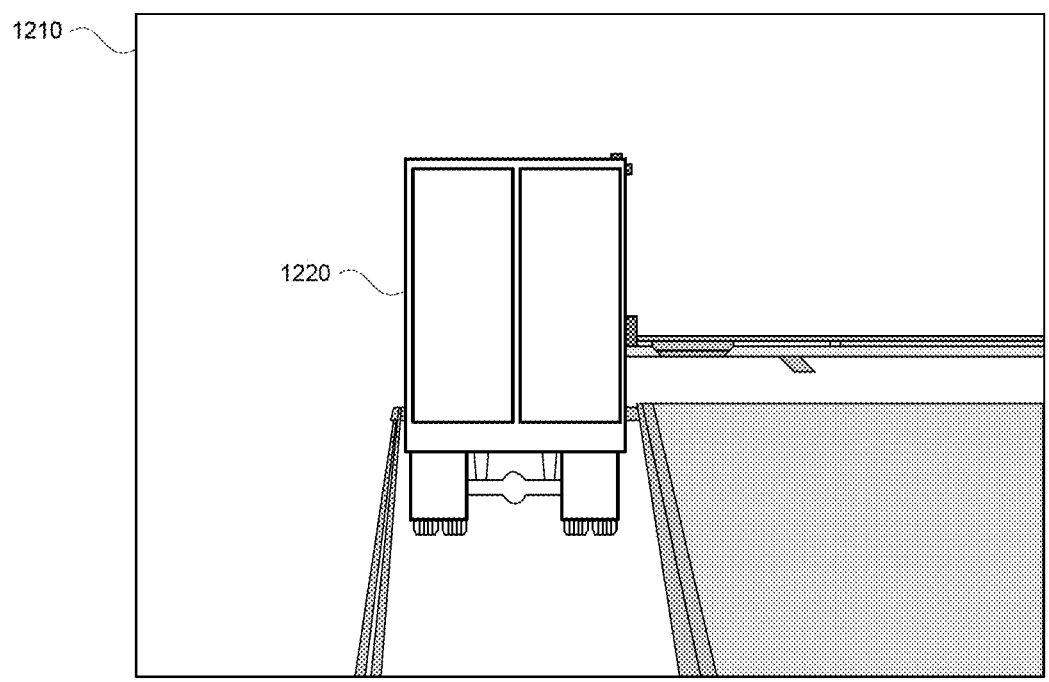
FIG. 12 is an example image in accordance with aspects of the disclosure.

In some instances, certain of the objects of the transferred labels may actually be occluded with respect to the vehicle's perception system when the vehicle is at the first location which can, in some situations, be undesirable for training purposes. As such, the labels associated with occluded objects may be filtered or removed. As an example representation of this, FIG. 12 provides an example image 1210 which would have included the traffic light 620, but does not as the traffic light 620 is occluded by a tractor trailer 1220. In this regard, images such as image 1210 may be removed or discarded (in other words, labels would not be transferred, automatically generated, etc.) as discussed further below.

In one instance, the filtering may be done based on detecting static and dynamic occlusions via LIDAR sensor data captured at the second point in time. For instance, dynamic or static occlusions within range of the LIDAR sensor data captured at the second point in time may be identified. In order to do so, a local surfel map may be built for static objects for LIDAR sensor data using free space constraints such that if an area of space is ever identified as empty, that area is assumed to always be empty. A ray can then be cast from the vehicle to the location of the bounding box to determine whether there are any intervening objects, or rather, dynamic or static occlusions. Labels with high occlusion ratios may then be removed or discarded. In other words, if the ray intersects with another object before the location of the bounding box, the camera images at the second point in time can be removed or discarded.

In addition or alternatively, a human operator may review images of the sensor data to confirm and/or identify whether any of the labeled objects of the first sensor data are occluded. For example, a portion of the first sensor data may be displayed at the same time as an image of the second sensor data. A 3D bounding box for a label of the second sensor data may be projected into the 2D space of the camera images of the second sensor data. The human operator may then be asked to confirm whether the object that appears in the first sensor data also appears in the second sensor data, or rather within the projected location of the 3D bounded box, and vice versa. If so, the human operator may provide confirmation that the object in the second sensor data is not occluded. If not, the human operator may provide some indication that the object in the second sensor data is occluded, and the object in the second sensor data may be flagged or otherwise associated with a label identifying the object as occluded, not occluded, visible, not visible, etc. This may enable occluded objects to be filtered for some purposes and retrieved for other purposes. In some instances, the human operator may also be able to correct errors in one or both labels (e.g. change dimensions, etc.).

Alternatively, rather than using a human operator, a machine-learned model, e.g. a neural network, may be trained to perform similar functions. For instance, a visual similarity net may be trained on image patches that uses image feature embeddings to compute a score of how similar two image patches are. The net may then be used to compare the image patches of the label between timestamps to determine if it is still visible.

In some instances, the "transferred" labels may be used to estimate accuracy of labels. For instance, the human operator may be asked to label sensor data from the vehicle one at a time (e.g. label the first sensor data and the second sensor data). The human operator applied labels from the first sensor data transferred to the second sensor data. Any disparities between the directly applied labels and the transferred labels may be determined. In situations in which the localization accuracy is perfect, the only source of error would be from the human operator. Conversely, assuming the accuracy of labels applied by a human operator to be perfect allows measurement of the error in the vehicle's localization and could even be used to provide pose constraints for map information used to localize and control the vehicle in the autonomous driving mode and to thereby improve quality of the map information.

In the case of a moving vehicle passing a static object, the labels of the first sensor data can be extended outside the range of the second sensor data. This may provide numerous opportunities for training and improving perception systems and other software. For instance, the "transferred" labels for the second sensor data as well as the second sensor data itself may be used to train machine learning models including neural networks and other models. For instance, as noted above, there may be labels for well beyond the maximum perceptive range for a particular sensor, such as a LIDAR sensor. In such cases, models may be trained and evaluate the perception system of the first vehicle which may use data from other types of sensors (such as cameras and radar) to infer the presence of objects beyond the maximum perceptive range for the particular sensor. In addition, this maximum perceptive range can be reduced in certain situations, such as in bad weather where there is fog, snow, rain, etc., and the ability to obtain labels in such conditions even at more reasonable ranges especially useful. In addition, having additional labels with additional details about various objects may be used to improve the accuracy of such models and thereby reduce false positives (detection of an object that does not exist) as well as false negatives (failure to detect an object when one exists).

The features described herein may enable the automatic generation of highly-accurate three-dimensional labels for sensor data with very little costs in terms of time or processing power. By "transferring" labels generated by different sensors of a vehicle at different times with different positions and orientations, sensor data can be labeled for objects which may otherwise have not been detected in the second sensor data as they may have been beyond the vehicle's effective perceptive range or occluded at the second point in time due to other objects or weather conditions. Further, in some situations labels generated for the first sensor data by the vehicle's perception system at the first point in time may have lower confidence values due to factors such as distance to the object or whether the object was partially occluded. In situations in which the vehicle may have been closer to the object or have a better perspective view of that object at the first point in time, the labels generated by the vehicle at the first point in time may have a higher confidence than labels generated by the vehicle at the second point in time. Therefore, transferring the labels from the first sensor data for the first point in time to the second sensor data at the second point in time, may provide labels for the second sensor data that have higher confidence than the labels directly generated for the second sensor data.

Unless otherwise stated, the foregoing alternative examples are not mutually exclusive, but, may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A vehicle comprising:
a perception system including:
a first sensor rotating at a frequency and configured to generate first sensor data during a single rotation of the first sensor, the first sensor data identifying first location and orientation of the vehicle at a first point in time, and
a second sensor configured to generate second sensor data identifying a second location and orientation of the vehicle at a second point in time different from the first point in time, wherein a difference in time between the first point in time and the second point in time is based on the frequency of rotation of the first sensor; and
one or more computing devices having one or more processors configured to control the vehicle in an autonomous driving mode based on the first sensor data and the second sensor data.

2. The vehicle of claim 1, wherein the second location and orientation of the vehicle are different from the first location and orientation of the vehicle.

3. The vehicle of claim 1, wherein the first sensor data includes light detection and ranging (LIDAR) sensor data and the second sensor data includes one or more images.

4. The vehicle of claim 1, wherein the first sensor data is associated with a first label for an object.

5. The vehicle of claim 4, wherein the perception system is configured to determine that a localized position of the object did not change more than a predetermined amount during a time period between the first point in time and the second point in time.

6. The vehicle of claim 5, wherein the first label is used to automatically generate a second label for the second sensor data.

7. The vehicle of claim 1, wherein the frequency is 10 Hz or 10 revolutions per second.

8. The vehicle of claim 1, wherein the first sensor data includes bounding boxes and one or more associated labels for objects detected by the perception system.

9. The vehicle of claim 8, wherein the bounding boxes represent a three-dimensional space that includes all data points generated by a sensor corresponding to each of the objects.

10. The vehicle of claim 8, wherein the one or more associated labels identify information about each of the objects.

11. A method of controlling a vehicle in an autonomous driving mode, the method comprising:
receiving, by one or more processors, first sensor data generated during a single rotation of a first sensor rotating at a frequency, wherein the first sensor data identifies a first location and orientation of the vehicle at a first point in time;
receiving, by the one or more processors, second sensor data generated by a second sensor at a second location and orientation of the vehicle at a second point in time different from the first point in time, wherein a difference in time between the first point in time and the second point in time is based on the frequency of rotation of the first sensor; and
controlling, by the one or more processors, the vehicle in the autonomous driving mode based on the first sensor data and the second sensor data.

12. The method of claim 11, wherein the second location and orientation of the vehicle are different from the first location and orientation of the vehicle.

13. The method of claim 11, wherein the first sensor data includes light detection and ranging (LIDAR) sensor data and the second sensor data includes one or more images.

14. The method of claim 11, wherein the first sensor data is associated with a first label for an object.

15. The method of claim 14, further comprising:
determining, by the one or more processors, that a localized position of the object did not change more than a predetermined amount during a time period between the first point in time and the second point in time.

16. The method of claim 15, wherein the first label is used to automatically generate a second label for the second sensor data.

17. The method of claim 11, wherein the frequency is 10 Hz or 10 revolutions per second.

18. The method of claim 11, wherein the first sensor data includes bounding boxes and one or more associated labels for objects detected by at least one of the first sensor or the second sensor.

19. The method of claim 18, wherein the bounding boxes represent a three-dimensional space that includes all data points generated by a sensor corresponding to each of the objects.

20. The method of claim 18, wherein the one or more associated labels identify information about each of the objects.

* * * * *

UNITED STATES PATENT AND TRADEMARK OFFICE
CERTIFICATE OF CORRECTION

PATENT NO. : 12,204,969 B2  
APPLICATION NO. : 17/893376  
DATED : January 21, 2025  
INVENTOR(S) : Justin Thorsen et al.

Page 1 of 1

It is certified that error appears in the above-identified patent and that said Letters Patent is hereby corrected as shown below:

In the Claims

Claim 1, Column 18, Lines 6 and 7:
Now reads: "the first sensor data identifying first location and orientation of the vehicle" should read
-- the first sensor data identifying a first location and orientation of the vehicle --

Signed and Sealed this
Twenty-fifth Day of February, 2025

Coke Morgan Stewart
*Acting Director of the United States Patent and Trademark Office*